Aug. 11, 1925.
H. E. LEWIS
1,549,274
PLANT SUPPORT
Filed Oct. 24, 1923
*Fig. 1*
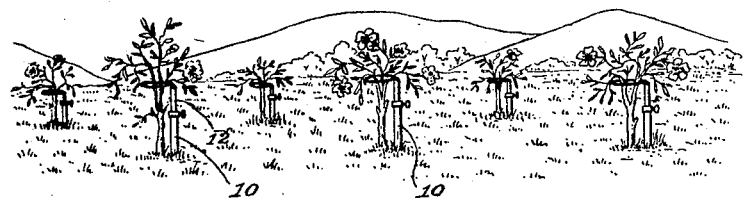
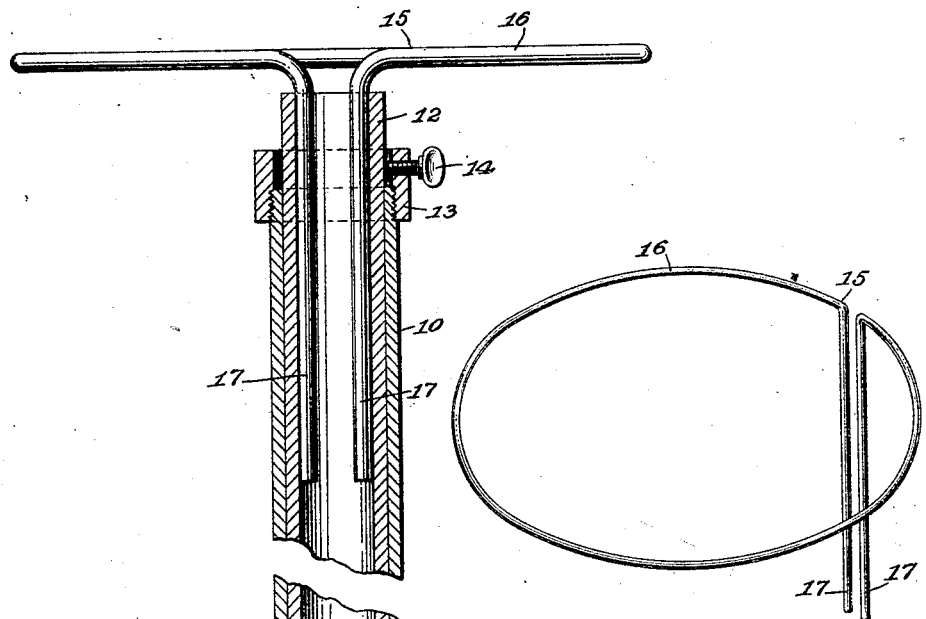
*Fig. 2*
*Fig. 3*
INVENTOR
Hancy E. Lewis
BY H. S. Manning
ATTORNEY Patented Aug. 11, 1925.

1,549,274

UNITED STATES PATENT OFFICE.

HANCY E. LEWIS, OF WATERTOWN, CONNECTICUT.

PLANT SUPPORT.

Application filed October 24, 1923. Serial No. 670,450.

*To all whom it may concern:*

Be it known that I, HANCY E. LEWIS, a citizen of the United States, and a resident of Watertown, county of Litchfield, and State of Connecticut, have invented certain new and useful Improvements in Plant Supports, of which the following is a specification.

This invention relates to devices for supporting growing plants, and more particularly to a support for holding garden plants having heavy blossoms or weak stems, or for supporting plants such as dahlias and peonies which are liable to spread apart to an undesired degree.

One object of this invention is to produce a plant support of the above nature which will be simple, cheap to manufacture, ornamental in appearance, easy to operate, and very efficient and durable in use.

With these and other objects in view, there has been illustrated on the accompanying drawing one form in which the invention may be conveniently embodied in practice.

Fig. 1 represents a perspective view of a series of plant supports shown in actual use in a flower garden.

Fig. 2 is a sectional view of a plant support embodying the invention.

Fig. 3 is a perspective view of the wire supporting ring shown detached from the remainder of the device.

Referring now to the drawings in which like reference numerals denote corresponding parts throughout the several views, the numeral 10 indicates an outer tubular standard preferably cylindrical throughout its length and having a solid pointed end 11 adapted to be driven into the ground.

Telescoped within the standard 10 is a tube 12 which is open at both ends. The tube 12 is preferably cylindrical and is slightly longer than the cylindrical part of the standard 10 so that even in the lowermost position of the tube it will extend above the top of the standard. The upper portion of the standard 10 is threaded on its exterior to receive the collar 13, said collar being threaded on its interior at its lower end, said threads being adapted to engage the threads on the upper portion of the standard 10.

The collar 13 is preferably cylindrical in shape and is provided with an upper unthreaded portion adapted to extend above the tubular standard 10. An adjusting thumb-screw 14 passes through the collar and engages the outside of the tube 12. By means of this construction, it will be seen that the tube 12 may be readily slid up and down within the standard 10, and may be secured in any desired adjusted position relative thereto.

In order to directly support the stem or blossom of the plant, a ring member 15 is provided, said ring member comprising a horizontal circular loop 16, and having its ends bent downwardly to form legs 17, said legs being perpendicular to the plane of the loop 16.

The depending legs 17 are preferably spaced apart somewhat so that when they are inserted in the tube 12, the resiliency of the loop will cause the legs to press outwardly and tightly grip the inside of the tube.

In operation, when it is desired to use the device, the loop 16 will first be removed from the tube 12. The legs 17 will then be spread apart to encircle the plant after which they will be brought together again, and forced down into the tube as far as they will go. The tube 12 will then be slid upward to the desired height and clamped securely in the desired position within the standard 10 by means of the thumb-screw 14.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In a plant support, a hollow standard adapted to be driven into the soil, a tube adapted to slide within said standard, means for securing said tube in any adjusted position within said standard, and a wire loop having its ends inserted within the top of said tube for encircling the stem of a plant to support it from falling.

2. In a plant support, a hollow cylindrical standard adapted to be driven into the soil, the top of said standard being threaded on its exterior, a tube slidably mounted within said standard, a tapped collar screwed on the top of said standard, means in said collar for securing said tube in any desired adjusted position within said standard, and a wire loop having its ends inserted within the top of said tube for encircling the stem of a plant to keep it from falling.

3. In a plant support, a standard adapted to be driven into the soil, a hollow cylindrical tube adapted to be slidably supported by said standard, means for holding said tube and standard in any desired relative position, and a wire loop having its ends located in said tube for supporting the stem of a plant.

4. In a plant support, a tubular standard adapted to be driven into the soil, a tubular member sliding within said standard and adapted to extend above the top thereof, a wire loop having downturned ends extending into said tubular member for holding the stem of a plant from falling, and means for detachably securing said tubular member and said standard in any desired adjusted position.

In testimony whereof, I have affixed my signature to this specification.

HANCY E. LEWIS.